3,495,009
PHARMACEUTICAL COMPOSITIONS AND METHODS FOR TREATING INFLAMMATORY CONDITIONS WITH HALOGENATED FLAVONES
Pierre A. Tronche, Clermont-Ferrand, Puy-de-Dome, France, assignor to Ferlux, Zone Industrielle de-Cournon-d' Auvergne, pres de Clermont-Ferrand, Puy-de-Dome, France, a French body corporate
No Drawing. Filed Apr. 14, 1967, Ser. No. 630,836
Claims priority application France, Apr. 26, 1966, 59,013
Int. Cl. A61k 27/00
U.S. Cl. 424—283       4 Claims

ABSTRACT OF THE DISCLOSURE

A medicament and method for the treatment of diseases connected with inflammatory processes wherein the active ingredient is a flavone halogenated in the 4' position and having the formula:

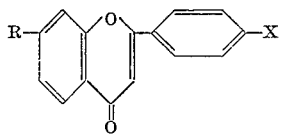

wherein X is a chlorine or fluorine atom and R is a hydrogen atom, hydroxyl or sulphonic oxypropyl radical.

---

This invention relates to a new medicine for the treatment of diseases connected with inflammatory processes, such as gout, polyarthritis, or conjunctivitis, which is characterised in that it is at least partly constituted by at least one flavone halogenated in the 4' position and having the formula:

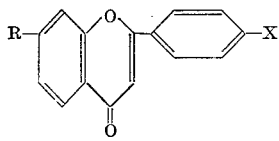

in which X is a chlorine or fluorine atom and R is a hydrogen atom or a hydroxyl or oxypropyl-sulphonic radical.

It relates more particularly to medicines based on hydroxy - 7 - chloro - 4' - flavone, fluoro - 4' - flavone, propyl (sodium γ-sulphonate)-oxy-7-chloro-4'-flavone.

Medicines of this type may be prepared in the form of tablets, injectable solutions, or collyria.

Tablets may be made up with a medicinal weight of 0.1 g. of halogenated flavone per tablet.

Collyria advantageously contain 1% of halogenated flavone.

Good therapeutic results are generally obtained by treatment with a dose of 0.3 g. of halogenated flavone per diem, particularly for the treatment of gout, polyarthritis, and spondylarthritis.

Conjunctivitis generally yields to treatment with a collyrium, with four instillations a day.

The flavones for the medicines according to the invention may be prepared by three-stage processes, such as that described by T. S. Wheeler: "Organic Syntheses," John Wiley & Sons, New York, 32, pp. 72–74, 1952.

Thus, hydroxy-7-chloro-4'-flavone $C_{15}H_9ClO_3$ may be prepared in the following manner:

(a) *1st stage.*—Preparation of di-(p.-chloro-benzoyloxy)-2-4-acetophenone $C_{22}H_{14}Cl_2O_5$.

15.2 g. (0.1 mol) of dihydroxy-2-4-acetophenone are dissolved in 27 ml. of anhydrous pyridine. 35 g. (0.2 mol) of p. chlorobenzoyl chloride are then added all at the same time. The temperature rises to 125° C. in two minutes.

After from 12 to 15 minutes, the mixture is poured on to 600 ml. of 3% hydrochloric acid and 500 g. of crushed ice. The precipitate formed is drained (grinding in a mortar if necessary). The product is washed with 20 ml. of methyl alcohol and then with 20 ml. of water. It is dried in vacuo over phosphoric anhydride.

Weight obtained: 36 g.; yield: 84%; M.P.: 99° C.

(b) *2nd stage.*—Preparation of dihydroxy-2-4-chloro-4'-dibenzoylmethane $C_{15}H_{11}ClO_4$.

20 g. (0.047 mol) of di-(p.-chlorobenzoyloxy)-2-4-acetophenone are dissolved in 110 ml. of anhydrous pyridine.

The solution is brought to 64° C. 6 g. (0.107 mol) of finely ground potash are added all at the same time. The mixture is agitated. It is allowed to cool to ambient temperature and acidified with 150 ml. of 10% acetic acid. The yellow precipitate formed is filtered and washed with a little water. It is dried in vacuo over phosphoric anhydride.

Weight obtained: 19 g.; yield: 95%; M.P.: 215° C.

(c) *3rd stage.*—Preparation of hydroxy-7-chloro-4'-flavone $C_{15}H_9ClO_3$.

10 g. (0.031 mol) of dihydroxy-2-4-chloro-4'-dibenzoylmethane, 100 ml. of acetic acid, and 2 ml. of concentrated sulphuric acid are brought to a temperature of 100° C. for one hour, agitating from time to time. The mixture is then poured on to 300 g. of crushed ice.

The precipitate formed is filtered and washed until the washing water is neutral.

It is recrystallised from dioxane.

Weight obtained: 78 g.; yield: 83%; M.P.: 238°–239° C.; mol. wt.: 256.5.

*Analysis.*—Calculated percent: C, 70.24; H, 3.54; Cl, 13.82. Found: C, 70.36; H, 3.54; Cl, 13.80.

In the same way fluoro-4'-flavone may be prepared from para-fluorobenzoyl chloride ortho-hydroxy-acetophenone in order to form para-fluoro-benzoyloxyacetophenone $C_{15}H_{11}FO_3$, which is treated with potash and then with acetic acid to form ortho-hydroxy-fluoro-4'-dibenzoylmethane $C_{15}H_{11}FO_3$, which in turn is treated with acetic acid and sulphuric acid to obtain fluoro-4'-flavone $C_{15}H_9FO_2$ melting at 150° C. (mol. wt. 240.2).

*Analysis.*—Calculated percent: C, 75.00; H, 3.78; F, 7.92. Found: C, 75.26; H, 3.68; F, 7.85.

A water-soluble derivative can easily be obtained from hydroxy-7-chloro-4'-flavone in the following manner:

1 g. (0.0037 mol) of hydroxy-7-chloro-4'-flavone is solubilised in 30 ml. of boiling dioxane. 85 mg. (0.0037 mol) of metallic sodium are added a small portion at a time.

The mixture is heated with reflux for 30 minutes, and then 0.5 g. (0.004 mol) of oxypropane-3-sulphonic acid anhydride-1-3 is added. Heating with reflux is continued for 30 minutes more, and then the mixture is allowed to cool and the orange-red precipitate of propyl (sodium γ-sulphonate) oxy-7-chloro-4'-flavone formed is filtered.

The product is washed with a little dioxane and then with alcohol.

It is recrystallised from ethyl alcohol.

Weight obtained: 0.5 g.; M.P.: 290° C.; mol. wt.: 416.8.

*Analysis.*—Calculated percent: C, 51.90; H, 3.38; S, 7.68. Found: C, 50.68; H, 3.37; S, 7.42.

With chloro-4'-flavones, whether or not hydroxylated at position 7, tablets may for example be prepared in accordance with the following formulae:

Formula A:

| | G. |
|---|---|
| Chloro-4'-flavone | 0.100 |
| Sugar | 0.150 |
| Starch | 0.010 |
| Talc | 0.003 |
| Magnesium stearate | 0.002 |

Formula B:

| | |
|---|---|
| Fluoro-4'-flavone | 0.100 |
| Sugar | 0.150 |
| Starch | 0.010 |
| Talc | 0.003 |
| Magnesium stearate | 0.002 |

Halogenated flavones may be prepared in the form of collyria in fixed suspensions in an isotonic aqueous plasma vehicle with the addition of a suspension agent, such as methyl cellulose.

By way of example the following formula may be used in ocular instillations:

Formula C:

| | G. |
|---|---|
| Hydroxy-2-chloro-4'-flavone | 1 |
| Sodium borate | 0.14 |
| Boric acid | 1.81 |
| Sodium chloride | 0.70 |
| Methyl cellulose | 1 |
| Distilled water: quantity sufficient for 100 ml. | |

A collyrium of this type has a pH of 7 and is isoosmotic to the lacrymal secretion.

A clear collyrium may be prepared with the aid of propyl (sodium γ-sulphonate) oxy-7-chloro-4'-flavone in accordance with the following formula:

Formula D:

| | G. |
|---|---|
| Propyl (sodium γ-sulphonate) oxy-7-chloro-4'-flavone | 1 |
| Sodium borate | 0.14 |
| Boric acid | 1.50 |
| Sodium chloride | 0.50 |
| Distilled water: quantity sufficient for 100 ml. | |

In order to evaluate general and local toxicity, the L.D.$_{50}$ of halogenated flavones was determined on batches of albino mice of "Swiss" breed by intraperitoneal administration.

The method used was that of Karber and Behrens.

Karber G.: Arch. f. Path. u. Pharm., 162, 480, 1931.

Behrens B.: Arch. f. Exp. Path. u. Pharm. 140, 237, 1929.

Behrens B. Karber.: Arch. f. exp. Path. u. Pharm. 177, 379, 1935.

The results were as follows:

| | G./kg. |
|---|---|
| Chloro-4'-flavone | 1.88 |
| Fluoro-4'-flavone | 0.276 |
| Propyl (sodium γ-sulphonated)-oxy-7-chloro-4'-flavone | 1.2 |

When administered locally, no intolerance reaction was noted when collyria prepared in accordance with formulae C and D were instilled into the eye of a rabbit. This result was observed both after multiple instillations every day and after thrice-daily instillations for two months.

The anti-inflammatory activity of the halogenated flavones according to the invention was tested by the kaolin method of inducing oedem in the paw of a rat.

Hillebrecht J.: Arznemittel-Forsch. 4, 607, 1954.

Experimental inflammation of the rear paw of a white rat was effected by injecting a kaolin suspension under the plantar aponeurosis. The extent of the oedema was appreciated by measuring the variation of the volume of the paw affected by the injection (plethysmographic measurement).

The substance to be tested was administered preventively and its influence on the development of the oedema was appreciated by comparison with control animals.

Phenylbutazone was used as reference substance.

Halogenated flavones and phenylbutazones are administered by probing in a 40 mg./ml. solution in sugar syrup, at the rate of 500 mg./kg.

The table below shows the percentages of volume increase of the paw of the rat at the different stages of development of the oedema. Adjoining columns show the results obtained with control animals, with animals treated with chloro-4'-flavone, and with animals treated with phenylbutazone.

| | | Treatment with— | |
|---|---|---|---|
| Time, hours | Control Animals | Chloro-4'-flavone | Phenyl-butazone |
| 1 | 35.7±4.9 | 39.2±8.9 | 36.4±3.4 |
| 3 | 49.8±6.5 | 50.3±9.7 | 48.5±5.3 |
| 6 | 70.0±8.6 | 58.2±10 | 48.3±6.6 |
| 24 | 60.2±7.2 | 57.2±10 | 56.9±7.8 |
| 48 | 52.5±6.8 | 54.9±7.7 | 52.8±7.4 |

The anti-inflammatory activity was clearly shown from the 6th to the 24th hour.

Values preceded by the sign ± represent the standard deviation.

The table below shows percentages of volume increase of the paw of the rat as in the previous example, but in the case of animals treated with the fluoro-4'-flavone, phenylbutazone serving as reference substance.

| | | Treatment with— | |
|---|---|---|---|
| Time, hours | Control Animals | Chloro-4'-flavone | Phenyl-butazone |
| 1 | 24.9±4.0 | 26.2±5.0 | 24.5±5.2 |
| 3 | 37.7±4.2 | 29.6±4.2 | 21.8±4.7 |
| 6 | 43.0±5.3 | 32.2±7.0 | 18.9±4.3 |
| 24 | 40.7±6.5 | 32.5±5.7 | 31.5±5.5 |
| 48 | 25.5±7 | 29.6±5.8 | 30.5±8 |

The anti-inflammatory activity was clear from the 1st to the 48th hour.

Values preceded by the sign ± represent the standard deviation.

The local anti-inflammatory activity of propyl (sodium γ-sulphonate) oxy-7-chloro-4'-flavone may be demonstrated by the conjunctival reaction of the eye of the rabbit, in the following manner:

Six rabbits were chosen whose eyes were previously examined with a biomicroscope in a dark-room, in order to eliminate any ocular affection.

Three drops of capsicum tincture are instilled into the right and left eyes of each rabbit. The left eye serves as control, the right eye receiving three drops of collyrium in accordance with Formula D.

At the end of a few minutes the control eyes exhibit intensive vaso-dilatation with conjunctival hyperhaemia, which lasts for about six to eight hours. The right eyes have scarcely coloured conjunctivitis.

The collyrium based on propyl (sodium γ-sulphonate)-oxy-7-chloro-4'-flavone has a powerful decongestive action and a local anti-inflammatory effect of curative type.

Clinical tests confirm the action of flavones halogenated in the 4' position on medical affections of inflammatory nature, as will be shown by the following examples.

EXAMPLE 1

Mr. Clu . . . 36 years of age.

Sharp pains and, in the sacroiliac region, attack of the sacroiliac articulation.

X-ray shows commencement of probable ankylosing spondylarthritis syndesmophytosis.

Treatment with chloro-4-flavone at the rate of three tablets per diem, according to Formula A above.

Reduction of pain, diminution of inflammatory phenomena.

Very good toleration.

EXAMPLE 2

Mr. Men . . . 60 years of age.

Plethoric heavy eater.

Pain in region of large toe with swelling of metacarpophalangeal articulation. Acute attack of gout.

Treatment with flouro-4'-flavone at the rate of three tablets per day, according to Formula B above.

Rapid reduction of pain and disappearance of articular phenomena.

Excellent toleration.

EXAMPLE 3

Miss Del . . . 42 years of age.

Articular pains of ankles and wrists with articular swelling and high speed of sedimentation. Evokes diagnosis of evolutive chronic polyarthritis.

Treatment with fluoro-4'-flavone at the rate of three tablets a day, according to Formula B above.

Rapid reduction of inflammatory symptoms.

Excellent toleration.

EXAMPLE 4

Mr. Age . . . 31 years of age.

Skiing instructor, has bilateral actinic conjunctivitis with photophobia and abundant secretions.

Instillation of collyrium in accordance with Formula D are prescribed for 48 hours, at the rate of four instillations a day.

At the end of this time the conjunctiva has regained its normal coloration and all sensation of pain has disappeared.

The flavones halogenated in the 4' position, and particularly those which are quoted as examples, may therefore be used for the preparation of highly active and well colorated pharmaceutical compositions; their effectiveness is revealed both when administered locally and when administered orally.

I claim:

1. A method of treating inflammatory disorders selected from the group consisting of gout, polyarthritis, and conjunctivitis, which comprises administering to a host suffering therefrom an anti-inflammatory amount of at least one flavone compound having the formula:

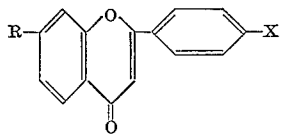

wherein X is selected from the group consisting of chlorine and fluorine and R is selected from the group consisting of hydrogen, hydroxyl and sulphonic oxypropyl.

2. The method of claim 1, wherein the flavone compound is selected from the group consisting of hydroxy-7-chloro-4'-flavone, fluoro-4'-flavone and propyl (sodium-γ-sulphonate)-oxy-7-chloro-4'-flavone.

3. A pharmaceutical composition in tablet form for treating inflammatory disorders comprising an inert carrier and about 0.1 g. of flavone having the formula

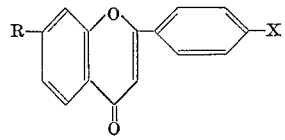

4. A pharmaceutical composition in collyrium form for treating inflammatory disorders comprising an isotonic aqueous plasma vehicle containing about 1% of a suspended halogenated flavone having the formula:

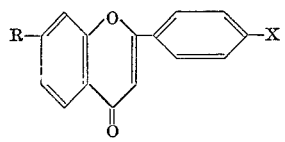

wherein X is selected from the group consisting of chlorine and fluorine, and R is selected from the group consisting of hydrogen, hydroxyl and sulfonic oxypropyl.

References Cited

UNITED STATES PATENTS 3,219,531   11/1965   Blaise _____ 167—81
3,352,754   11/1967   Gazave _____ 167—81

ALBERT T. MEYERS, Primary Examiner

H. M. ELLIS, Assistant Examiner

U.S. Cl. X.R.

260—345.2